United States Patent [19]

Goldenthal et al.

[11] Patent Number: 5,625,749

[45] Date of Patent: Apr. 29, 1997

[54] SEGMENT-BASED APPARATUS AND METHOD FOR SPEECH RECOGNITION BY ANALYZING MULTIPLE SPEECH UNIT FRAMES AND MODELING BOTH TEMPORAL AND SPATIAL CORRELATION

[75] Inventors: William D. Goldenthal, Cambridge; James R. Glass, Arlington, both of Mass.

[73] Assignee: Massachusetts Institute of Technology, Cambridge, Mass.

[21] Appl. No.: 293,584

[22] Filed: Aug. 22, 1994

[51] Int. Cl.$^6$ .................................. G10L 5/00; G10L 5/06
[52] U.S. Cl. .................. 395/2.63; 395/2.64; 395/2.62; 395/2.46; 395/2.48; 395/2.49; 395/2.5; 395/2.51
[58] Field of Search ...................... 395/2.55, 2.6, 395/2.64, 2.62, 2.46, 2.48, 2.49, 2.5, 2.51

[56] References Cited

U.S. PATENT DOCUMENTS

| | | | |
|---|---|---|---|
| 4,994,983 | 2/1991 | Landell et al. | 395/2.54 |
| 5,023,911 | 6/1991 | Gerson | 395/2.62 |
| 5,036,539 | 7/1991 | Wrench, Jr. et al. | 395/2.55 |
| 5,199,077 | 3/1993 | Wilcox et al. | 381/43 |
| 5,333,236 | 7/1994 | Bahl et al. | 395/2.65 |

OTHER PUBLICATIONS

John R. Deller, Jr., John G. Proakis, and John H. L. Hansen "Discrete-Time Processing of Speech Signals", Macmillan, pp. 634–638 1993.

Thomas W. Parsons, "Voice and Speech Processing", McGraw–Hill, pp. 172–174 1987.

Digalakis, Vassilios V., "Segment–Based Stochastic Models of Spectral Dynamics for Continuous Speech Recognition", Ph.D. Thesis, Boston University (1992).

Digalakis, Vassilios V., et al., "ML Estimation of a Stochastic Linear System with the EM Algorithm and Its Application to Speech Recognition", *IEEE Transactions on Speech and Audio Processing*, 1(4):431–442 (Oct. 1993).

Digalakis, Vassilios, V., et al., "A Dynamical System Approach to Continuous Speech Recognition", *Proceedings of the International Conference on Acoustics, Speech and Signal Processing*, pp. 289–292 (May 1991).

Digalakis, Vassilios V., et al., "Improvements in the Stochastic Segment Model for Phoneme Recognition" *Proceedings 2nd DARPA Workshop on Speech and Natural Language*, pp. 332–338 (Oct. 1989).

Digalakis, Vassilios V., et al., "Fast Algorithms for Phone Classification and Recognition Using Segment–Based Models", *IEEE Transactions on Signal Processing*, pp. 1–31 (Dec. 1992).

(List continued on next page.)

*Primary Examiner*—Allen R. MacDonald
*Assistant Examiner*—Tálivadis Ivars Šmits
*Attorney, Agent, or Firm*—Hamilton, Brook, Smith & Reynolds, P.C.

[57] ABSTRACT

Phonetic recognition is provided by capturing dynamical behavior and statistical dependencies of the acoustic attributes used to represent a subject speech waveform. A segment based framework is employed. Temporal behavior is modelled explicitly by creating dynamic templates, called tracks, of the acoustic attributes used to represent the speech waveform, and by generating the estimation of the acoustic spatio-temporal correlation structure. An error model represents this estimation as the temporal and spatial correlations between the input speech waveform and track generated speech segment. Models incorporating these two components (track and error estimation) are created for both phonetic units and for phonetic transitions. Phonetic contextual influences are accounted for by merging context-dependent tracks and pooling error statistics over the different contexts. This allows for a large number of contextual models without compromising the robustness of the statistical parameter estimates. The transition models also supply contextual information.

26 Claims, 6 Drawing Sheets

OTHER PUBLICATIONS

Ostendorf, Mari, et al., "Context Modeling with the Stochastic Segment Model", *IEEE Transactions on Signal Processing*, 40(6):1584–1587 (Jun. 1992).

Ostendorf, Mari, et al., "Continuous Word Recognition Based on the Stochastic Segment Model", *DARPA Proceedings on Continuous Speech Recognition Workshop*, (Sep. 1992).

Ostendorf, Mari and Roukos, Salim, "A Stochastic Segment Model for Phoneme–Based Continuous Speech Recognition", *IEEE Transactions on Acoustics, Speech, and Signal Processing*, 37(12):1857–1869 (Dec. 1989).

Roucos, Salim, et al., "Stochastic Segment Modelling Using the Estimate–Maximize Algorithm", *Proceedings of the International Conference on Acoustics, Speech and Signal Processing*, pp. 127–130 (Apr. 1988).

Kannan, Ashvin., et al., "Maximum Likelihood Clustering of Gaussians for Speech Recognition", *IEEE Transactions on Speech and Audio Processing* (to appear Jul. 1994) (Nov. 1, 1993).

Kannan, Ashvin and Ostendorf, Mari, "A Comparison of Trajectory and Mixture Modeling in Segment–Based Word Recognition", *IEEE Proceedings of the International Conference on Acoustics, Speech and Signal Processing*, pp. 1–4, (1993).

Kimball, Owen, et al., "Context Modeling with the Stochastic Segment Model", *IEEE Transactions on Signal Processing*, 40(6):1584–1587 (Jun. 1992).

Kimball, Owen and Ostendorf, Mari, "On the Use of Tied–Mixture Distributions" *Proceedings ARPA Workshop on Human Language Technology*, pp. 102–107, (Mar., 1993).

Davis, Steven B. and Mermelstein, Paul, "Comparison of Parametric Representations for Monosyllabic Word Recognition in Continuously Spoken Sentences", *IEEE Transactions on Acoustics, Speech, and Signal Processing*, 28(4):357–366 (Aug. 1980).

Deng, Li, "A Generalized Hidden Markov Model with State–Conditioned Trend Functions of Time for the Speech Signal", *Signal Processing*, 27:65–78 (1992).

Duda, Richard O. and Hart, Peter E., "Pattern Classification and Scene Analysis", John Wiley & Sons (New York) (1973).

William D. Goldenthal and James R. Glass, "Modelling Spectral Dynamics for Vowel Classification", *Proceeding of Eurospeech 93*, pp. 289–292, (Berlin, Germany) (Sep. 1993).

Gong, Yifan and Haton, Jean–Paul, "Stochastic Trajectory Modeling for Speech Recognition", *Proceedings ICASSP 94, Australia*, pp. I–57–I–60 (Mar. 1994).

Robinson, Tony, "Several Improvements to a Recurrent Error Propagation Network Phone Recognition System", pp. 1–11, *Technical Report*, Cambridge University Engineering Dept, (Sep. 30, 1991).

Russell, Martin, "A Segmental HMM for Speech Pattern Modelling", *Proceedings of International Conference on Acoustics, Speech and Signal Processing 93*, pp. 499–502, (Minneapolis, MN) (Apr. 1993).

Marcus, Jeffrey N., "Phonetic Recognition in a Segment–Based HMM", *Proceedings International Conference on Acoustics, Speech and Signal Processing*, pp. 478–482 (Minneapolis, MN) (Apr. 1993).

| Class | Phones | Class | Phones | Class | Phones |
|---|---|---|---|---|---|
| a | a,ɔ | u | u,ü | v | v |
| æ | æ | r | r | ð | ð |
| ʌ | ʌ,ə,əʰ | l | l,ḷ | ɾ | ɾ |
| aʷ | aʷ | w | w | p | p |
| aʸ | aʸ | y | y | b | b |
| ɝ | ɝ,ɚ | m | m,m̩ | t | t |
| ɛ | ɛ | n | n,n̩,r̃ | d | d |
| e | e | ŋ | ŋ,ŋ̍ | k | k |
| I | I,Ɨ | s | s | g | g |
| i | i | z | z | č | č |
| o | o | š | š,ž | ǰ | ǰ |
| ɔʸ | ɔʸ | f | f | h | h,ɦ |
| ʊ | ʊ | θ | θ | | |
| SILENCE | pº,tº,kº,bº,dº,gº,◌,◌,h# | | | | |

FIG. 9

SEGMENT-BASED APPARATUS AND METHOD FOR SPEECH RECOGNITION BY ANALYZING MULTIPLE SPEECH UNIT FRAMES AND MODELING BOTH TEMPORAL AND SPATIAL CORRELATION

GOVERNMENT SUPPORT

This invention was made with government support under Grant Number N0014-89-J-1332 awarded by the United States Navy. The government has certain rights in the invention.

BACKGROUND

The task of automatic speech recognition (ASR) essentially consists of decoding a word sequence from a continuous speech signal. In order to achieve reasonable levels of performance, past ASR systems have constrained the permissible speech input in order to simplify the decoding task. Typical constraints are (i) speaker dependency, i.e., training the system for each individual speaker, (ii) word quantity, i.e., limiting the system vocabulary to a small number of words or requiring input to be isolated words only, and (iii) read speech (as opposed to also permitting spontaneous speech), or some combination of (i) through (iii). Recently however, state-of-the-art systems have been able to achieve reasonable performance levels for speaker independent, continuous/spontaneous speech systems, operating with vocabularies of greater than 5,000 words.

Figure 1:
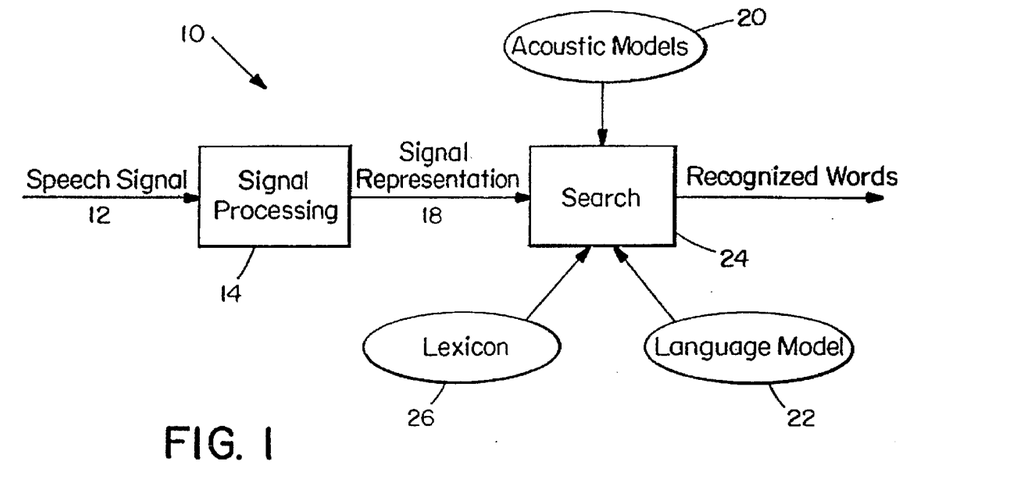
FIG. 1 is a block diagram of an automatic speech recognition system of the type in which an embodiment of the present invention may be employed.

A block diagram of the major components of a typical ASR system 10 is shown in FIG. 1. Typically, the samples of the continuous speech signal 12 are first processed by a signal processor 14 to form a discreet sequence of observation vectors 18. The components of the observation vectors are the acoustic attributes that have been chosen to represent the signal 12. Examples of commonly chosen attributes are Discrete Fourier Transform based spectral coefficients or auditory model parameters. Each observation vector 18 is called a frame of speech, and the sequence of T frames forms the signal representation, $\vec{O} = \{\vec{o}_1, \vec{o}_2, \ldots, \vec{o}_T\}$. Acoustic and language models 20, 22 are then used to score the frame sequence O, search a lexicon and hypothesize word sequences. The models 20, 22, search and scoring procedure 24 are highly implementation dependent.

As the number of words in the lexicon 26 becomes large, the task of training individual word models becomes prohibitive. Consequently an intermediate level of representation is generally used. A common representation involves describing the pronunciation of a word in terms of phonemes. A phoneme is an abstract linguistic unit. Changing a phoneme changes the meaning of a word. For example, if the phoneme /p/ in the word "pit" is changed to a /b/, the word becomes "bit". A small number of phonemes can be used to describe all the words in a given language (English consists of roughly 40 phonemes). By representing word pronunciations as a sequence of phonemes, the number of acoustic models and the required training data can be drastically reduced.

Phonemes can be realized in a variety of acoustically distinct manners depending on the phonetic context (e.g., syllable position, neighboring phones), the stress, the speaker, and other factors. The actual acoustic realization of a phoneme is known as a phone. This distinction between a phoneme and a phone is an important one. The different acoustic realizations of the same phoneme do not affect the meaning of a word. An example of this often occurs in the word "butter" where the phoneme /t/ is frequently realized in American English as a "flap" (a particular phone). The acoustic variability that can occur when realizing the same phoneme is part of what makes the task of identifying a phoneme so challenging. The standard distinction is to utilize / / to indicate a phoneme and [ ] to indicate a phone.

The acoustic models are generally trained to recognize some set of phones (the exact set being a design decision). The task of decoding a phone sequence is known as "phonetic recognition," and the resulting output is known as a phonetic transcription. The phonetic transcription may or may not be mapped to a string of phonemes, but regardless, it is a fundamental importance to the ASR task since it is the foundation upon which the word string search is based. Virtually all modern, state-of-the-art speech systems utilize phonetic models as a basis for recognition.

Phonetic recognition methods tend to fall into two categories. The first, and most widely used, is "frame" based. Each observation frame in the sequence $\vec{O} = \{\vec{o}_1, \ldots, \vec{o}_T\}$ receives a score for each phonetic model in the system. There is no presegmentation of the signal into larger units. An example of a frame-based phonetic recognition method is the Hidden Markov Models (HMM's). HMM's consists of a set of states connected to each other via transition probabilities. While occupying a state, observations are generated randomly from a probability density function. The transition probabilities and output distributions together constitute an HMM model. The key assumption inherent in an HMM is that the observations are independent, given the state sequence up to the current time.

Thus HMM's handle certain temporal aspects of the speech problem in an elegant manner. The variability of durations over a phone training set is handled automatically by the fact that the state sequence can be as long or short as necessary. Another advantage of the HMM approach is that it does not require an explicit temporal alignment, or segmentation, of the speech signal. Since each frame in an utterance receives its own score, the likelihood scores for alternative segmentations can be directly compared to each other. The alignment which results in the best score for the entire utterance is then chosen. Finally, an efficient technique, the Baum-Welch reestimation algorithm, exists for training HMM's.

In HMM's, temporal correlations are represented implicitly through the statistics of the state sequence and are not modelled explicitly. However, it has been demonstrated that significant temporal correlations do exist. See V. Digilakis, "Segment-Based Stochastic Models of Spectral Dynamics for Continuous Speech Recognition", Ph. D. Thesis, Boston University, 1992. Also see W. Goldenthal and J. Glass, "Modelling Spectral Dynamics for Vowel Classification," *Proc. Eurospeech* 93, pp. 289–292, Berlin, Germany, (September 1993), incorporated herein by reference.

There have also been attempts to explicitly model the dynamics of the acoustic attributes within an HMM framework. Generally this has been done with some-success, by incorporating first (and possibly second) order differences of the acoustic parameters in the observation vector. Other approaches are segmental HMM's proposed by Russell and Marcus and state-conditioned trend functions used by Deng. See "A Segmental HMM for Speech Pattern Modelling", by M. Russell in *Proceedings of the ICASSP* 93, pages 499–502, Minneapolis, Minn. April 1993; "Phonetic Recognition in a Segment-Base HMM" by J. Marcus in *Proceedings of the ICASSP* 93, pages 479–482 Minneapolis, Minn. April 1993; and "A Generalized Hidden Markov Model With State-Conditioned Trend Functions of Time for the Speech Signal" by L. Deng, *Signal Processing* 27, Vol. 1, pages 65–78 April 1992. None of these approaches have gained general acceptance within the community or been shown to generate results superior to more traditional HMM's.

A second type of phonetic recognition method involves a "segment" based approach. These methods hypothesize start and end times of larger units within the speech signal which generally represent individual phonetic units of speech. An example of a segment-based method is the Stochastic Segment Models (SSM). SSM's are a segment-based approach that attempts to both model the spectral dynamics of a phonetic unit and to capture the temporal correlation within a phonetic segment. However, SSM's impose a very high dimensionality on the Gaussian probability density functions used to estimate the correlations (on the order of 112 to 140). As a consequence, no implementation of this method has yet to successfully incorporate the temporal correlation information. In fact, an implementation utilizing only the temporal correlations performed slightly worse than an implementation which assumed complete statistical independence. See S. Roucos, M. Ostendorf, H. Gish, A. Derr, "Stochastic Segment Modelling Using the Estimate-Maximize Algorithm", in Proceedings ICASSP 88, pages 127–130, April 1988.

As between segment-based and frame-based methods, segment based systems offer the potential advantage of being able to accurately capture segment level dynamics as well as directly modelling temporal correlations within the segment. Also, segment level features, such as segment duration, are easily incorporated. The advantage of a frame-based system is that each frame receives its own score and the scores for different transcription candidates are directly comparable. In a segment-based frame work, it can be difficult to compare utterance likelihoods which propose different numbers of segments. Also, a frame-based system tends to have a computational advantage since the segmentation step does not have to be explicitly performed.

Further, other methods for phonetic recognition include template-based approaches, statistical approaches and more recently approaches based on dynamic modeling and neural networks. A recursive error propagation neural network approach has been used with the TIMIT speech corpus. See T. Robinson, "Several Improvements to a Recurrent Error Propagation Phone Recognition System", *Technical Report CUED/TINFENG/TR.* 82, 1991. An inherent drawback of neural networks is a large amount of time needed to train the models.

SUMMARY OF THE PRESENT INVENTION

The present invention overcomes many of the problems and disadvantages of the prior art. In particular, the present invention provides improved phonetic recognition in an automatic speech recognition system, or any other system which utilizes phonetic transcription. The present invention specifically provides improved acoustic models.

The present invention phonetic recognition method is both template-based and statistical-based. The templates are used to capture dynamic characteristics at the segment level, and the statistics measure the spatial (meaning within the parameter space) and temporal correlations of the errors.

In particular, the present invention generates a dynamic representation of a phonetic unit, called a "track". The present invention also generates a statistical model of the error when a track is compared to a phonetic segment. This in effect creates a dynamic trajectory of the acoustic attributes (or measurements) used to represent the speech signal, and the incorporation of the temporal correlations into a statistical model for each phonetic unit. As mentioned above, the HMM's are not able to explicitly model the temporal correlations. The present invention approach provides a vehicle for modelling these correlations.

In the preferred embodiment, speech recognition apparatus of the present invention decodes an input speech signal to a corresponding speech unit (e.g. phonetic unit) in a digital processor as follows. A plurality of unit templates is provided. Each unit template represents acoustic attributes of a respective speech unit such as a phonetic unit or a string of phonetics. In addition, each unit template generates a respective target speech unit or a synthetic segment. Processor means then compares the synthetic segments/target speech units to portions of the input speech signal to define a set of error sequences. The processor means generates therefrom a plurality of error models, one for each unit template. Each error model represents the temporal and spacial correlations in the error sequences defined between the synthetic segments and input speech signal. Based on the error models, a determination is made of the corresponding speech unit of the input speech signal. In particular, the respective speech unit of the unit template corresponding to the best or most likely error model (e.g. the one with greatest probability) is the transcription or translation of the input speech signal.

According to one aspect of the present invention, the unit templates employ a generation function to generate the target speech units or synthetic segments. In addition, the generation function is used to initially form each unit template.

In a preferred embodiment of the present invention, each error model is formed from a probability density function, such as a joint Gaussian probability density function. In addition, each error sequence is normalized to a fixed dimension before the processor means generates the error models. Preferably each error sequence is normalized by averaging.

According to another feature of the present invention, the plurality of unit templates includes transition unit templates. The transition unit templates represent transitions between speech/phonetic units within a speech signal. Further, the transition unit templates provide an indication of either location of a transition in the input speech signal, or the speech units involved in the transition or both.

According to another aspect of the present invention, a combination of unit templates is used to form a multiplicity of merged templates. The merged templates account for contextual effects on the respective speech units of the initial unit templates.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

By way of background, speech is produced by the coordinated manipulation of a set of articulators, including the tongue, lips, jaw, vocal folds, and the velum. The speaker-dependent characteristics of the articulators and the vocal tract can cause a large amount of acoustic variability in the realization of the same phoneme sequence. The speaker's environment, mood, health, and prosody (pitch and emphasis) can all affect the acoustic realization of a phonemic sequence. In addition to these speaker-dependent effects, the phonemic context influences the motion of the articulators and the resulting acoustic output. It is frequently unclear where one phonetic segment ends and the next begins. The overlapping of phonetic segments stems from overlap in adjacent articulatory gestures. This phenomenon is known as co-articulation, and causes large variations in the acoustic realization of a phoneme.

Despite the high degree of variability in the speech signal, there exists much that is consistent both within a phonetic unit and across an utterance. This consistency is what makes spoken communication so robust. A given phone generally has a configuration of the articulators or target position associated with it. Whether or not the target position is reached, there tend to exist intervals of speech which are predominantly representative of a particular phone. Despite differences among different speaker's physical characteristics, the articulators will share similar relative motions when realizing the same phone. This similarity in the dynamics of the articulators generally translates into similar dynamics in the acoustic attributes of the phone.

Therefore, the applicants have discovered that the trajectories of the acoustic attributes share similar dynamic characteristics for a given sequence of phones as the articulators move through a similar sequence of gestures. The greater the similarity of the phonetic context, the greater the similarity of the motion of the acoustic attributes.

Statistical models of the phonetic units have historically provided a robust method for dealing with the variability between speakers. These statistical models may provide correlation information between the acoustic attributes at a specific time, and over a specified time interval. The applicants have found that the temporal correlation information can provide a means for accounting for the fact that the same vocal tract is producing the entire phonetic sequence in an utterance. These temporal correlations in the speech signal are not modeled directly in most prior art implementations. The most popular current method, HMMs (discussed above), are only able to model these correlations indirectly. The present invention demonstrates the importance of the temporal correlations and constructs models which utilize them effectively. The temporal correlation information provides a means for accounting for the fact that the same vocal tract is producing the entire phonetic sequence in an utterance.

Figure 2:
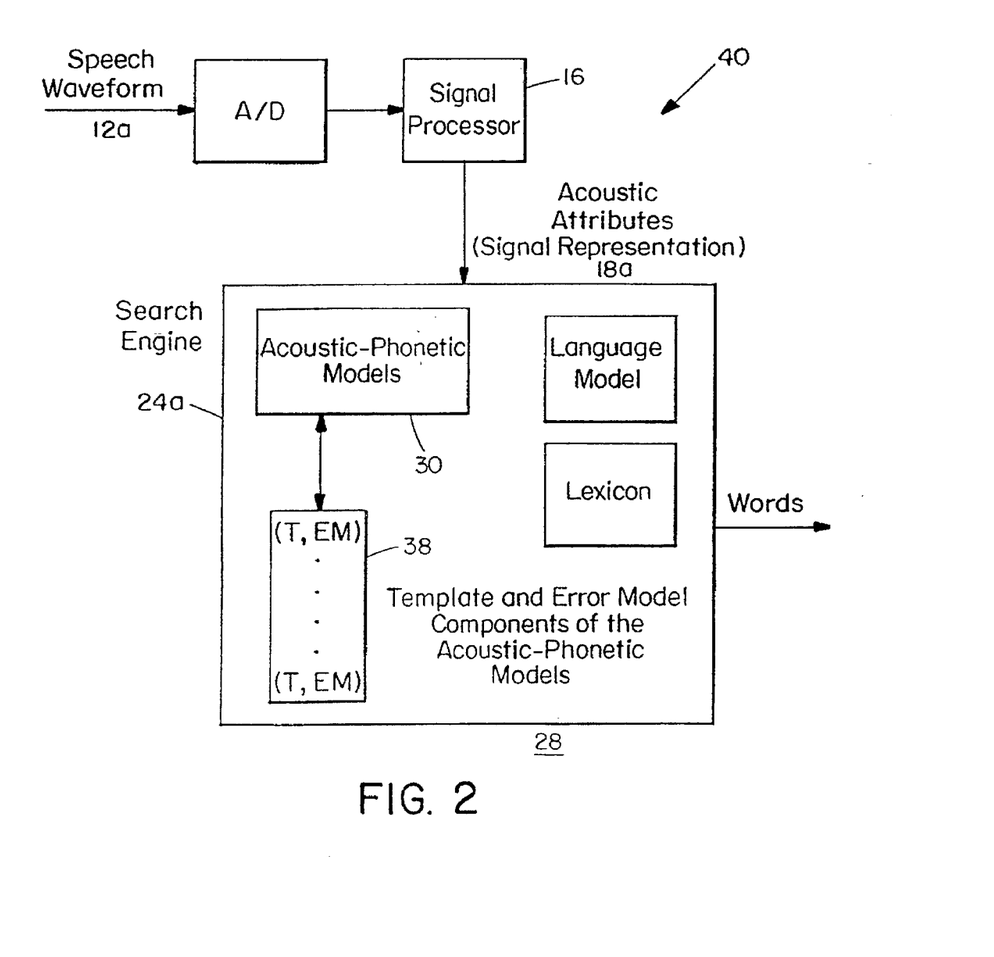
FIG. 2 is a schematic diagram of one embodiment of the present invention.

Turning now to the particulars of the present operates in an automatic speech recognition system 40 such as that depicted in FIG. 2 (and similar to that of FIG. 1). As noted earlier, the continuous speech (input) signal is digitally sampled and then processed via a temporal and/or spectral analysis into a sequence of observation frames. In the preferred embodiment, the input signal 12a is preprocessed by signal preprocessor 16 (FIG. 2) as follows. The signal representation 18a to be generated and used throughout the present invention consists of the Mel-frequency cepstral coefficients (MFCC's) described by P. Mermelstein and S. Davis "Comparison of Parametric Representations for Monosyllabic Word Recognition in Continuously Spoken Sentences", *IEEE Trans. ASSP*, Vol. 23 No. 1, pages 67–72 (February 1975) incorporated herein by reference. These coefficients are based on the short-time Fourier transform of the speech signal 12a. The cepstrals provide a high degree of data reduction over using values of the power spectral density directly, since the power spectrum at each frame is represented using relatively few parameters.

The key steps in producing the MFCC's are:

1. Analog conversion of the continuous speech waveform 12a into digitized samples. Preferably the sample frequency is 16 kHz.

2. The digitized signal is then pre-emphasized via first differencing to reduce the effects of spectral tilt.

3. The digitized samples are blocked or rectangularly windowed into frames. The frames are typically on the order of 25 or 30 ms.

4. The frames are windowed using a Hamming, Hanning or other common window known in the art, to reduce the effects of assuming the signal 12a is zero outside the boundaries of the frame. In the preferred embodiment, a Hamming window of duration 25.6 ms is used.

5. The frames are computed using a fixed rate moving window at increments of 5 to 15 ms. Preferably, 5 ms increments or 200 frames per second are used. Hence, there is a large degree of overlap between frames. The idea is that the signal 12a can be considered quasi-stationary within a frame.

6. A 256 point (for example) Discrete Fourier Transform is then computed for each frame. Other types of transform-based or similar processing, common in the art, are suitable.

7. The Fourier transform coefficients are squared, and the resulting squared magnitude spectrum is passed through a set of 40 overlapping Mel-frequency triangular filter blanks. The log energy outlet of each of these filters collectively form the 40 Mel-frequency spectral coefficients (MFSC), $X_j$, $j=1,2, \ldots 40$.

8. A cosine transform of the MFSC's is then used to generate the 15 MFCC's which are the acoustic attributes used in the present invention. The Mel-frequency filters consist of thirteen triangles spread evenly on a linear frequency scale form 130 Hz to 1 kHz, and 27 triangles evenly distributed on a log-arithmic scale form 1 kHz to 6.4 kHz. Since the bandwidths of the triangular filters increase with center frequency, the area of each filter is normalized to avoid amplifying the higher frequency coefficients. The cosine transform which yields the MFCC, $C_i$, $i=0,1,2\ldots,14$, from the MFSC is:

$$C_i = \sum_{j=0}^{40} X_j \cos\left[i\left(j-\tfrac{1}{2}\right)\tfrac{\pi}{40}\right]$$

Note that the lowest cepstral coefficient, $C_o$, is a summation of the log energy from each filter. Therefore, it is indirectly related to the amount of energy in a frame.

Once the signal representation 18a has been generated from the digital signal processor 16, a search component 24a employs the acoustic model 30 of the present invention to incorporate dynamical models of the acoustics spectra into the phonetic recognition task as follows. First, the acoustic model 30 of the present invention determines a means of mapping a phone's (or a given unit of speech's) variable duration tokens onto a fixed length track. A track is defined to be a trajectory or temporal evolution of the acoustic attributes (or measurements) over a segment. That is, the purpose of the track is to accurately represent and account for the dynamic behavior of the acoustic attributes (or measurements) over the duration of a phone. A track consists of and is represented by a sequence of M state vectors $T=\{\vec{t}_1,\ldots,\vec{t}_M\}$ which are used as the basis for generating a variable duration synthetic segment:

$$G=f(T,N)=\{\vec{g}_1,\ldots,\vec{g}_N\}$$

for any number of frames N where f() is a generation function. To that end, the tracks serve as a template for the units of speech (e.g. phones) they are modelling and captures segment level spectral dynamics.

After a track is computed from the training tokens for a particular phone, the same tokens are used to generate an error model EM based on the differences between synthetic segments generated from the track and the training tokens. The error model (EM) is then processed to determine identity of the speech segment. As such, the purpose of the error model is to represent the correlations, both temporal and spatial, that exist in the errors between the synthetic segments and the input tokens. The error model (EM) consists of a probability density function which is used to compute the likelihood scores used for phonetic classification. The error models in the preferred embodiment are jointly Gaussian probability density functions.

The track T and its associated statistical error model EM form a baseline model for each phonetic unit (i.e. form a phonetic model 38). Although the baseline (phonetic) model 38 provides a robust general characterization of the phonetic unit it represents, details attributable to phonetic context and speaker dependencies tend to be "averaged out". That is, since the track represents the phone in all contexts, it tends not to contain contextual information which is critical to enhancing model accuracy due to co-articulation. One means to address this problem is to create context-dependent tracks. Another is to specifically model the transition dynamics between phonemes. Both of these approaches are discussed in detail below.

It is important to distinguish between phonetic recognition and phonetic classification. In phonetic classification, the segmentation boundaries and utterance are known, and the task is to correctly classify each segment. In phonetic recognition, the segment boundaries are not known. As a result, insertion and deletion errors are possible along with substitution errors (i.e., misclassification).

A classification scheme which is compatible with the above components may be incorporated into the phonetic recognition task of the present invention. To that end, segmentation would be provided using existing methodologies common in the art, and an overall evaluation of the dynamic modelling approach of the present invention would be performed.

The foregoing components of FIG. 2 are implemented in computer code generally executed on a computer processor such as a VAX or similar computer/digital processing system. For purposes of illustration and not limitation, FIG. 2 depicts the search component 24a, present invention acoustic model 30 and associated parts operating in processor (memory) 28. Other computer configurations (in hardware, software or both) are in the purview of one skilled in the art.

Figure 3:
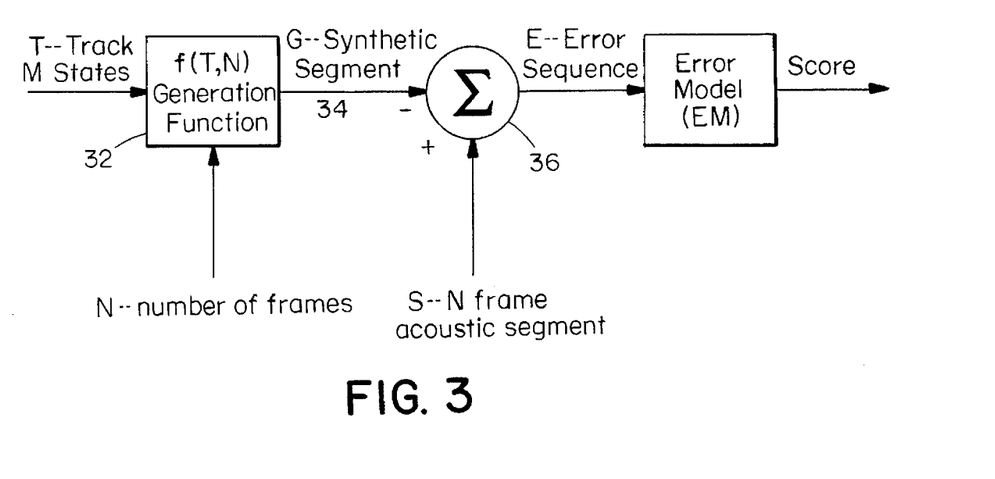
FIG. 3 is a schematic diagram of a track and error model pair in the embodiment of FIG. 2.
Figure 4A:
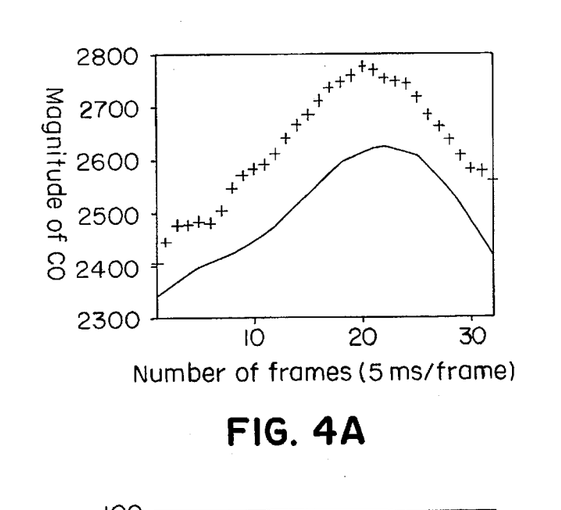
FIGS. 4A–4D are graphs illustrating track alignment of each of the Cepstral coefficients C0–C3 employed in the embodiment of FIG. 2.
Figure 4B:
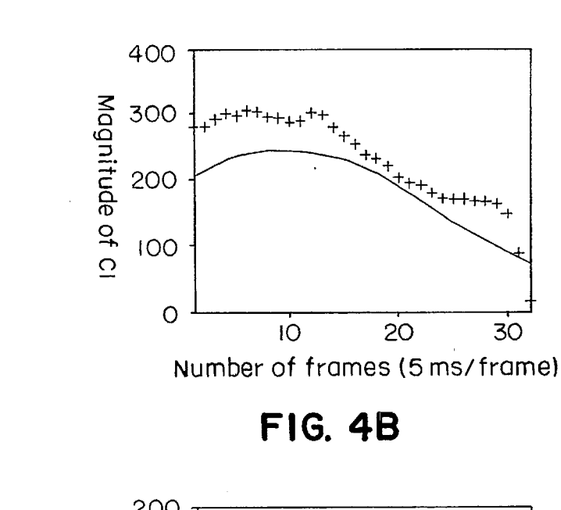
Figure 4C:
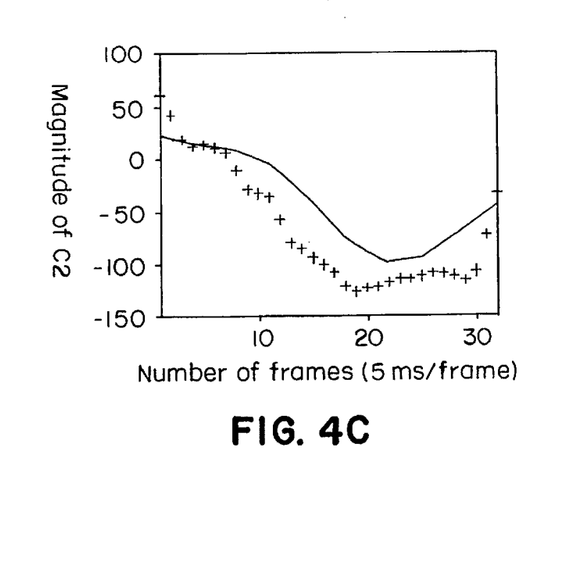
Figure 4D:
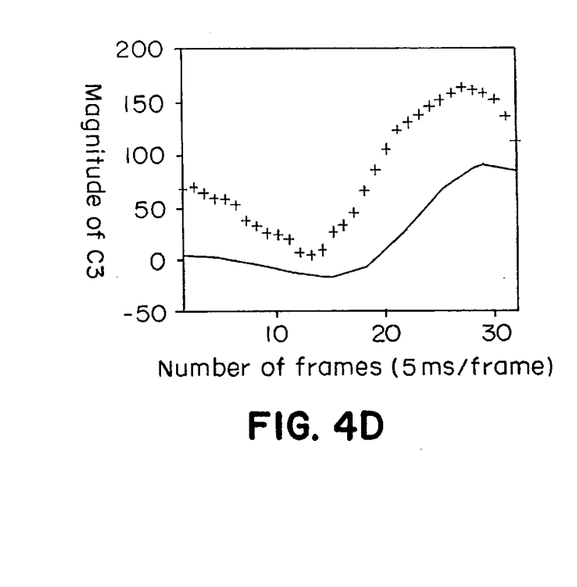

In particular, a phonetic model 30 (and supporting track and error model pairs 38) of the present invention are implemented as follows and illustrated in FIG. 3.

Tracks $\vec{T}_\alpha$ are computed from training data by mapping the training tokens for each phone to a sequence of M states. Each state is recorded as a vector, the sequence of vectors forming the track. The mapping function is known as a generation function f. When all the tokens in the training set for a particular phone have been mapped, the phone-dependent track is calculated from the maximum likelihood estimate of each state.

Once the tracks have been created, they serve as the initial stage in evaluating hypothesized speech segments. As shown in FIG. 3, to evaluate an N frame speech segment, S, a synthetic segment, G is generated. The generation function f (at 32), is used to compute the mapping from the M state track to the N frame synthetic segment 34. That is, for each state of track T, the generation function 32 aligns a data point from the frames values (stretched or compressed) and generates a template or synthetic segment G. The synthetic segment G produced by the generation function 32 is then compared directly to the N frame acoustic segment S to form an error sequence E as follows:

$$E=S-G=\{\vec{e}_1,\ldots,\vec{e}_N\}$$

where $\vec{e}_i=\vec{s}_i-\vec{g}_i$. See step 36 in FIG. 3. The error sequence is subsequently used to formulate the error model EM of the phonetic model 30 of FIG. 2.

Note that the generation function 32 used to map the track to a hypothesized number of frames is the same function that is used in the creation of the track. Hence, it is the generation function 32 which determines both the computation of the tracks and their alignment with speech segments during evaluation.

A key question that must be answered is how to map tokens of varying duration to a track. The fact that the same phone will have a large variability in its duration, even when spoken by the same speaker in the same context, must be accounted for in a robust manner. In consideration of durational variability, Applicants base the creation of tracks and their subsequent use on certain assumptions as follows.

Two simple contrasting assumptions that can be made concerning the durational variability of phonetic segments are:

1. The spectral dynamics involved in realizing an acoustic segment are invariant with duration. Differences in duration primarily reflect differences in speaking rate. Therefore, the trajectory followed by the acoustic attributes is the same. Generation functions which utilize this assumption are referred to as trajectory invariant generation functions. Trajectory invariant generation functions rescale the phonetic track in time, until it is of the same duration as the training or evaluation token.

Trajectory invariance as defined here does not imply that the gestures themselves are invariant, only the resulting dynamics of the acoustic attributes.

2. The spectral dynamics involved in realizing an acoustic segment are not invariant with duration. Differences in duration reflect actual differences in the trajectories of the acoustic attributes. In this case, the key assumption is that the dynamics in shorter phones is identical to part of the dynamics expressed in longer phones, such as the initial, central or final portion. Generation functions which utilize this assumption are referred to as time invariant generation functions. Time invariant generation functions align all tokens for the same phone about a fixed reference point in time. Therefore, unlike the trajectory invariant functions, there is no temporal expansion or compression of the acoustic trajectory. Instead, the trajectory of the acoustic attributes through the space will vary with phone duration.

Trajectory invariance assumes that the trajectory through the acoustic space does not vary with the duration of a specific phonetic unit. Under this assumption, tracks of the preferred embodiment consist of a fixed sequence of vectors. Each vector is a state, and hence the track is considered to be a sequence of states that the phone is modelled as passing through. Short phones are aligned to a subset of the track states, and long phones are aligned with the same state more than once. Trajectory invariant generation functions also align observations in between states via interpolation.

The trajectory invariant generation function determine the mapping of the track to the input token during both training (when the track is computed) and evaluation. Five alternative mapping procedures for generation function 32 are described below. In the first four procedures, each frame of the input token is utilized exactly once, both during track creation and evaluation. The fifth procedure is distinct in that data in long duration tokens is subsampled, and data in short tokens is augmented by interpolation. This allows each input token to contribute exactly one data point to each state of the track.

Table I provides pseudo-code for the trajectory invariant generation function Traj1. This method is based on a linearly interpolated mapping of a token's frame to the frames of the track. The initial and final frames of the token are always aligned with the initial and final frames of the track with intermediate frames falling linearly between. If the token is longer than the track, the same procedure is followed, but some frames of the track are mapped to more than one frame from the token. This means that multiple frames of the token are averaged into the same track frame for longer tokens. One problem with this method is that, depending on the number of states in the track, and the typical durations of the tokens it is representing, consecutive states of the track can receive disproportionate amounts of the training data due to the effects of mapping the frame to the nearest state.

TABLE I—Traj1

1. For all phone models, $\alpha$
2. Set all elements of $\vec{T}_\alpha$ and count to zero
3. num=track duration−1
4. For $1 \leq i \leq M_\alpha$
    (a) den=duration (i)−1
    (b) FOR $0 \leq j <$ duration(i)
        i. track_index=round_to_nearest_integer(j * num/den)
        ii. $\vec{T}_\alpha$(track_index) track_index)+(j)
        iii. count(track_index)=count(track_index)+1
5. FOR $0 \leq j <$ track_duration
    (a) $\vec{T}_\alpha(j) = \vec{T}_\alpha(j)/\text{count}(j)$
Where
   Track_duration is equal to a pre-specified duration (in frames) to be used for this track;
   $M_\alpha$ is the number of tokens in the training set for phone model $\alpha$;
   Count is the vector whose elements keep track of the number of tokens contributing at each point in time;
   Duration is the vector of size $M_\alpha$ containing the duration (in frames) of each token.

The second trajectory invariant generation function, Traj2, is defined by pseudo code in Table II. This procedure preserves the mapping of endpoint to endpoint but smooths out the contribution of interior points. Instead of mapping each frame of an input token to a particular frame of the track, the frame contributes its data to adjacent track frames in proportion to how closely it maps to each frame. That is, the procedure spreads out the contribution of an individual frame to both of the track states that it falls between. For example, a token's frame whose mapping to the track is 3.75 would contribute 25 percent of its value to the track's third state and 75 percent of its value to the track's fourth state. This results in smoother tracks, particularly for the short duration phones.

Table II—Traj2

1. For all phone models, $\alpha$
2. Set all elements of $\vec{T}_\alpha$ and count to zero
3. num=track duration−1
4. For $1 \leq i \leq M_\alpha$
    (a) den=duration (i)−1
    (b) FOR $0 \leq j <$ duration(i)
        i. track_index=floor (j * num/den)
        ii. frac=j * num/den−track_index; omfrac=1−frac
        iii. $\vec{T}_\alpha$(track_index)=$\vec{T}_\alpha$(track_index)+omfrac * $\vec{S}(j)$
        iv. count(track_index)=count(track_index)+omfrac
            If(j≠den) Do steps v. and vi.
        v. $\vec{T}_\alpha$(track_index+1)=$\vec{T}_\alpha$(track_index+1)+frac * $\vec{S}(j+1)$
        vi. count(track index+1)=count(track_index+1)+frac
5. FOR $0 \leq j <$ track_duration
    (a) $\vec{T}_\alpha(j) = \vec{T}_\alpha(j)/\text{count}(j)$
Where
   Track_duration is equal to a pre-specified duration (in frames) to be used for this track;
   $M_\alpha$ is the number of tokens in the training set for phone model $\alpha$;
   Count is the vector whose elements keep track of the number of tokens contributing at each point in time;
   Duration is the vector of size $M_\alpha$ containing the duration (in frames) of each token.

The third alternative trajectory invariant generation function is defined in Table III. This approach, Traj3, uses linear interpolation, but creates fictitious endpoint frames for both the input token and the track, which always map to each other. The effect of this is that the actual first frame of the input token is mapped to the interior of the track. Each token utilizes these fictitious endpoints which always map directly to the corresponding states of the track. Then the interior points are linearly interpolated. For tokens of duration equal to or longer then the track, the approach reverts to the fixed endpoint approach Traj1. The effect on shorter tokens is to map initial and final frames towards the interior of the trajectory. This is a compromise between the previous trajectory invariant generation functions.

TABLE III-Traj3

1. For all phone models, $\alpha$
2. Set all elements of $\vec{T}_\alpha$ and count to zero
3. num1=track_duration−1
4. num2=num1+2
5. For $1 \leq i \leq M_\alpha$
   (a) den1=duration(i)−1
   (b) den2=den1+2
   (c) FOR $0 \leq j <$ duration(i)
      i. if (duration(i)<track_duration) track_index=round_to_nearest_integer((j+1) * num2/den2)−1 else (revert to Traj1) track_index=round_to_nearest_integer(j * num1/den1)
      ii. $\vec{T}_\alpha(\text{track\_index}) = \vec{T}_\alpha(\text{track\_index}) + \vec{S}(j)$
      iii. count(track_index)=count(track_index)+1
6. FOR $0 \leq j <$ track_duration
   (a) $\vec{T}_\alpha(j) = \vec{T}_\alpha(j)/\text{count}(j)$
Where Track_duration is the pre-specified duration (in frames) to be used for this track; p1 $M_\alpha$ is the number of tokens in the training set for phone model $\alpha$;

Count is the vector whose elements keep track of the number of tokens contributing at each point in time;

Duration is the vector of size $M_\alpha$ containing the duration (in frames) of each token.

A fourth alternative trajectory invariant generation function of the present invention is constructed by combining elements of the Traj2 and Traj3 procedures above. The fractional interpolation scheme of Traj2 is used in combination with the fictitious endpoints used in the Traj3 procedure. The resulting procedure effectively smooths the tracks.

The above four approaches utilize every frame exactly once in the input token. Each frame is mapped to a point in time, or state, in the trajectory, and no data is created or ignored.

The fifth and final described approach is unique in that data is created by interpolating short tokens and by subsampling long tokens. Rather than map each frame of the input token to the trajectory, the input token is stretched or compressed until it has the same duration of the fixed duration track. If the input token has fewer frames than the track has states, it is expanded in time via a linear interpolation with the endpoints mapping to the endpoints of the track. If the input token has more frames than the number of states, then it is linearly compressed in time, the endpoints are again lined up, and the data is down sampled. Hence, each token in the training set contributes exactly one frame to each frame of the track. This approach is defined in Table IV.

TABLE IV-Traj5

1. For all phone models, $\alpha$
2. Set all elements of $\vec{T}_\alpha$ and count to zero
3. num=track duration−1
4. For $1 \leq i \leq M_\alpha$
   (a) den=duration(i)−1
   (b) FOR $0 \leq j <$ duration(i) track_index(j)=j * num/den (c) FOR $0 \leq n <$ track_duration
      (i) For $0 \leq j <$ duration(i)
      (A) deltax=n−track_index(j)
      (B) deltay=n−track_index(j+1)
      (C) If ((deltax>0.0) and (deltay<0.0.)) distance=track_index(j+1)−track_index(j) ratio=deltax/distance
         $\vec{T}_\alpha(\text{track\_index}) = \vec{T}_\alpha(\text{track\_index}) + \text{ratio}$ *
         $\vec{S}(j+1) + (1-\text{ratio}) * \vec{S}(j)$ (D) Else if (deltax=0.0)
         $\vec{T}_\alpha\text{track\_index}) = \vec{T}_\alpha(\text{track\_index}) + \vec{S}(j)$ 5. For $0 \leq j <$ track_duration
   (a) $\vec{T}_\alpha(j) = \vec{T}_\alpha(j)/M_\alpha$
Where Track_duration is the pre-specified duration (in frames) to be used for this track;

$M_\alpha$ is the number of tokens in the training set for phone model $\alpha$;

Count is the vector whose elements keep track of the number of tokens contributing at each point in time;

Duration is the vector of size $M_\alpha$ containing the duration (in frames) of each token.

The number of track states in the preferred invention is between about 9 and 10. The optimal number of states is determined as follows. If too few states are used, then the resulting tracks will not contain all of the relevant dynamical characteristics of the phone being modelled. If too many states are used, then unnecessary storage and computation costs are incurred. It is apparent that using too many states does not cause an increase in distortion.

As in trajectory invariant generation functions, time invariant generation functions determine the mapping of a track to the input token during both training and evaluation. In this alternative, the tracks are constructed by aligning each token about a reference point in time. Once the training tokens are all aligned, the mean value of each acoustic attribute is computed from the ensemble of tokens which contribute at each point in time. The result is a track for each phonetic model of length equal to the duration of the longest token in the training set for that phone. The tracks tend to be very smooth where many tokens contribute and noisier where fewer tokens contribute (those tokens of unusually long duration for a given phone).

Time invariant generation functions which align the training tokens at their midpoint (center) and left endpoint (start) and right endpoint (end) are available/suitable. The procedure to compute the center aligned tracks is shown in Table V. The procedure for the start and end time aligned tracks are conceptually identical to the center alignment procedure, only the initial and final alignment points differ. In these cases, there is no need to compute a midpoint since it is not needed for alignment.

TABLE V—Center Generation Function

1. For all phone models, $\alpha$
2. Set all elements of $\vec{T}_\alpha$ and count to zero
3. long($\alpha$)=max [duration(i)]
4. mid_point($\alpha$)=long($\alpha$)/2 (division with truncation)
5. For $1 \leq i \leq M_\alpha$
   (a) first_point=mid_point($\alpha$)−duration(i)
   (b) last_point=mid_point($\alpha$)+duration(i)
   (c) FOR first_point$\leq j \leq$last_point i. $\vec{T}_\alpha(j) = \vec{T}_\alpha(j) + \vec{S}(j\text{--first\_point})$
ii. count(j)=count(j)+1
6. FOR $1 \leq j \leq \text{long}(\alpha)$ (a) $\vec{T}_\alpha(j) = \vec{T}_\alpha(j)/\text{count}(j)$ Where $M_\alpha$ is the number of tokens in the training set for phone model $\alpha$;

Count is the vector whose elements keep track of the number of tokens contributing at each point in time;

Duration is the vector of size $M_\alpha$ containing the duration (in frames) of each token.

The biggest problem with the time invariant techniques is the potential for averaging out significant dynamical events due to improper temporal alignment. For example, this can occur at both the start and end of the track for the center alignment procedure. The ends of the tracks then tend to incorporate dynamics dominated by durational and contextual factors. The procedures (Traj1–Traj5) of Tables I through IV are preferred over the time invariant technique of Table V for the generation function 32 of FIG. 3.

FIGS. 4A–4D show example trajectories of Mel-frequency cepstral coefficients C0 through C3 for a synthetic oy segment generated from a 10-state track using procedure Traj2 and an oy token, selected at random from the test set. The synthetic segment is illustrated as the solid line and the test token is illustrated by the plus markings (+). The synthetic segment accurately captures the dynamic motion of the test token. Note, the temporal correlation of the error over the duration of the segment. That is, both the synthetic segment and the test token have the same general curve/shape over time. (The respective magnitudes differ but the shapes are mostly the same). Capturing this correlation is a key objective of the error models portion of the present invention, discussed next.

The speech signal varies slowly enough that successive frames of acoustic attributes are highly correlated in time. Despite this fact, the majority of existing speech recognition systems employ techniques (HMM's) which model the signal as a sequence of conditionally independent observations. No attempt is made to capture the statistical dependencies between frames either within or between phonetic segments. In contrast, the statistical error models EM of the present invention provide a basis for capturing the statistical dependencies of acoustic attributes within a speech segment.

The objective of the present invention statistical error model is to take advantage of information residing in the correlations both over time and between attributes. Many previous approaches are either not structured to capture all of the relevant correlation information or have been unable to do so in a robust manner.

The issue of creating a good probability density function which accounts for the correlation of information comes down to the capacity to deal effectively with two key difficulties. The first problem is due to the fact that the observation sequence varies in duration. For each segment that is hypothesized, the observation sequence will be N frames long, where N is variable. The second problem arises when the dimension of the distribution becomes large and the estimate of the covariance matrix parameters becomes difficult due to a lack of training data. To solve the first problem it is necessary to somehow normalize, in time, each sequence which is going to contribute to the probability density function estimate. The type of normalization which takes place then directly impacts the dimensionality of the resulting covariance matrix, and the capability of the procedure to estimate it effectively.

In the preferred embodiment, the statistical model (error model EM) is a joint Gaussian probability density function, based on the error sequence E (FIG. 3) discussed above. Applicant's have found a method that provides a good trade off, that is a method that allows the error vectors to be of varying frame length and allows normalization of the frame length by averaging the vectors over each of Q pieces. This technique has the advantages of reducing the dimensionality of the Gaussian probability density function while utilizing all of the data. Thus the model of the error used in the preferred embodiment is the maximum likelihood estimate of the mean, which is not zero, due to the averaging into Q pieces, and full covariance matrix for each phone. For P acoustic attributes (measurements), the result is a joint Gaussian density of dimension PQ. It is important to note that the dimension of the error model is independent of the number of states M used to characterize the track. In particular, dividing the error sequence E (FIG. 3) for each training token into Q pieces and averaging is accomplished in the preferred embodiment as follows. An error sequence E is defined by $$S_N - G_N = E_N = \{\vec{E}_1, \ldots \vec{E}_{N/Q} \ldots \underbrace{\vec{E}_{N(Q-1)} + 1 \ldots \vec{E}_N}_{Q}\}^T$$

and vector averaging within each subsegment is defined by $$\vec{E}_i = \frac{\sum_{j=\frac{N(i-1)}{Q}+1}^{Ni/Q} \vec{E}_j}{N/Q}$$

for i=1, . . . Q.

For example, for a ten state track with Q=3, that part of the error which resulted from comparing the token to the first third of the track (i.e., the first three and a third "states") would be averaged, and so on for each of the other two thirds. Concantenation of these vectors is then performed to generate a single vector of dimension QP (where P is the number of attributes in an observation vector), and it is this vector that forms the basis for estimating the probability density function $$\vec{V}_E = \{\vec{e}_{11} \ldots, \ldots, \vec{e}_{1P}, \ldots \vec{e}_{QP}\}^T$$

The resulting vectors $\vec{V}_E$ are computed for each training token and then used to estimate a jointly Gaussian probability density function for each phonetic model 38. Due to the averaging operation, the error distribution will not be zero-mean in practice, although the mean of the error should be very small compared to the standard deviation. The covariance matrixes are analyzed to determine which if any of the correlations are being captured. Preferably the correlations are examined by normalizing the covariance matrixes to produce a matrix of correlation coefficients. This is done by dividing the ij'th entry in the matrix of the product of the i'th and j'th standard deviations. The resulting correlations will range from −1 to +1, where the extremes imply complete linear correlation, and a value of zero means the i'th and j'th variables are independent.

Figure 5:
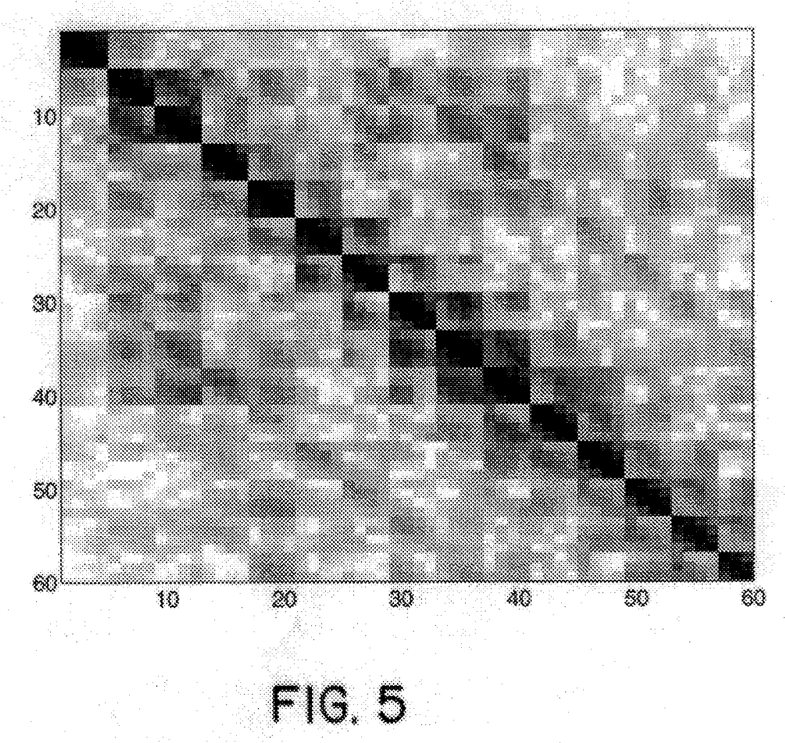
FIG. 5 is an illustration of a matrix of error correlation coefficients employed by the present invention.

FIG. 5 shows the resulting matrix for the phone ey, using a value of Q=4. The absolute value of each element has been taken so that the degree of correlation is displayed, with dark area indicating a high degree of correlation and white areas indicating statistical independence (the diagonal terms are black since every variable is completely correlated with itself). Each 4×4 sub-block represents the correlations between the two relevant MFCC's with their correlation at the same instant of time (each of the Q intervals running down the sub-block diagonal, and the temporal correlations between the two attributes appearing on the off diagonal). A rich correlation structure is clearly evident, and is strongest in a large block extending from C1 to C9. Temporal and spatial correlations are also clear between several sets of adjacent MFCC's.

The key idea behind context dependent modelling is to account for the variability in the realization of phones that occur due to the phonetic context. The motion of the articulators is highly influenced by the articulatory configurations of the proceeding phonetic segment referred to as the left context, and following phonetic segments, referred to as the right context. Often this contextual influence can extend across several phones.

An important consideration in designing context-dependant models is the problem of sparse training data. Ideally, complete models are constructed for a particular phone in a particular context. If context includes only an immediate left or right phonetic neighbor, it is a biphone model. If both left and right contextual dependencies are included, the model is a triphone model. As the phonetic model becomes more specific from a context independent model (O(N)models), to a biphone model (O($N^2$)models) or a triphone model (O($N^3$)models), fewer instances of the phone in the specific environment are available for training. Since most models require the estimation of a large number of parameters, the scarcity of the training data becomes a severe design constraint. Therefore, it is generally only possible to create full triphone models for the most common phonetic combinations. This is also the reason why contextual effects extending beyond the immediate phonetic environment are seldom modelled.

The present invention utilizes an approach which permits maximal pooling of training data to overcome the sparse data problem, while still modelling a large number of triphone units and covering a high percentage of the possible phonetic combinations. The present invention approach uses data only within a data phonetic segment. An alternative approach (discussed later) is to utilize acoustic information that spans adjacent segments. This lends itself well to the overall system since the transition regions of phonetic segments are highly dynamic.

The present invention takes advantage of the dynamic tracks and independently accounts for the left and right contexts by creating biphone tracks. The present invention then combines the biphone tracks to create triphone tracks as they are needed. Tracks can be estimated and stored for the left and right contexts separately and then merged when a synthetic segment is generated to create a triphone based synthetic segment.

Such an implementation dramatically reduces the magnitude of both the coverage problem and the sparse data problem. For a system with N=58 models, the maximum number of required context-dependent tracks is reduced from $N^3$=195,112, to 2* $N^2$=6,728, not accounting for the large number of transitions that never occur in English. The factor of two occurs because for a given transition one has two possible tracks (e.g., for [r] [a] the [r] data is used for modelling a right context track for [r], and the [a] data is used for modelling a left context track for [a]). This can help to alleviate both the sparse data problem and the coverage problem associated with context-dependent modelling.

Additionally, since the error modelling techniques are independent of the track, the number of statistical error models (which require the majority of parameters) is a design parameter, since the errors can be pooled over different contexts. This means only the tracks themselves will be context-dependent. This pooling of the error matrixes, if successful, will further alleviate problems associated with the sparse data.

Hence, the main ideas behind the present invention approach are (i) to generate robust biphone tracks, (ii) to merge these tracks to generate triphone synthetic segments, and (iii) to Use the errors generated from these triphones to estimate the error covariance parameters. By pooling the errors, tracks can be created for a large number of contexts without compromising the estimates of the parameters used in the Gaussian models. Finally, since the left and right contexts are utilized independently, triphone tracks can be created "on the fly" if needed during test. That is, contexts never seen during training can be created from the right and left biphone tracks. This presents a possible method of greatly increasing the coverage provided by the training set.

The basic premise behind merging biphone tracks to create a triphone based synthetic segment, is that the left context of a phone has its strongest influence on the left most portion of a phone, and the right context has its strongest influence on the right most portion. Early studies based on the vowels indicated that a linearly interpolated weighting of the left and right biphone tracks resulted in better distortion reduction than an exponentially interpolated weight. The following method yielded the best distortion reduction:

1. The synthetic segments for the two context-dependent biphone tracks (detailed below) are generated.
2. Each frame in the merged triphone synthetic segments receives contributions from each of the two synthetic segments just generated. These contributions are weighted using linear interpolation. The left context weights begin at a value of 1.0 for the first frame and end at a value of zero for the last frame. The right context weights for each frame are equal to 1.0 minus the left context weight. Note that the sum of the weights at each frame is 1.

The procedure implemented to cluster the phonetic tokens to form context-dependent tracks is performed separately for each phone, once for all left contexts and again for all right contexts. Given a phone and a left/right context, the procedure is as follows:

1. Create a separate track for every phonetic context in the training set. These are the seed biphone (left or right) tracks. Count the number of contributors to each track state.
2. For biphone tracks with only one or two contributors, merge these tracks with the biphone track nearest them using a distance metric such as the track distance metric (TDM).
3. Compute the distance between all remaining tracks using the distance metric (e.g. TDM). If the closest tracks have a TDM less than a threshold, merge them and repeat this step. Else stop.

TDM is based on a step-wise optimal computation, but does not guarantee that the final clusters will be optimal. The criterion takes into account the number of tokens in each cluster as well as the track distances from each other. A normalized Euclidean distance between the tracks is weighted by the number of contributors to each track state, and each state is also multiplied by the same weight which will be used when the tracks are merged. In general, TDM favors adding smaller clusters to larger ones rather than merging two medium size clusters. And, TDM is more heavily influenced by the left states when merging left context tracks and by the right states when merging right context tracks.

Letting P represent the number of acoustic attributes, M represent the number of states and N represent the count for each state in a track. Then given the merger weight $w_i$ for state i, the distance between two tracks for phone $\alpha$ in the two contexts $\beta$ and $\gamma$, is $TDM(T_\beta, T_\gamma)$:

$$TDM(T_\beta, T_\gamma) = \sum_{i=1}^{M} W_i \left[ \frac{N_{\beta_i} * N_{\gamma_i}}{N_{\beta_i} + N_{\gamma_i}} \right] \sum_{j=i}^{P} \left[ \frac{(T_{\beta ij} - T_{\gamma ij})^2}{\sigma_{\alpha j}^2} \right]$$

Recall that $\sigma^2_{\alpha j}$ are the phone dependent variances used to normalize the different acoustic attributes.

The threshold used in the clustering procedure is an important design parameter. If the threshold is set too high, the clustering will continue for too many iterations. This will result in a small number of clusters and contextual resolution will be lost. If the threshold is set to be too low then there will be many clusters but there will be two risk. First, there will be too many clusters which were trained on only a few tokens. This will result in non-robust tracks which may not be representative to be useful. Secondly, when the error covariance matrix is estimated, the errors will be superficially low for these sparse clusters. This will result in two "tight" an error covariance matrix, and system performance will suffer. Depending on the MFCC's employed, the threshold is generally between 10 and 500, and preferably 20, 30 or 50.

The alternative approach utilizes acoustic information that spans adjacent segments. The idea is to make tracks of the phonetic transitions themselves. This lends itself well to the overall approach, since the transition regions are highly dynamic because the articulators are generally in motion during this interval. During classification/recognition, the transition model scores augment the synthetic segment scores to provide contextual information.

The main difficulty which needs to be overcome is the very large number of phonetic transitions which occur. Again, sparse data considerations limit the number of models which can be created. however, many transitions are very similar. While it may be impractical to capture all of the transitions,it may be possible to create a significantly large subset of transitions models. The following outlines the steps for this alternative method.

1. Initial transition tracks are created by modelling all of the transitions across segment boundaries in the training set. In the preferred embodiment, a fixed number of frames centered about the transition boundary is used to create the transition tracks.

This is based on applicant's intuition that the rate at which the articulators move from one configuration to another need not be related to the duration of the phonetic segments. In other words, the transitions to and from a 200 ms [s] can be made at the same rate as the transitions to and from a 100 ms [s]. Therefore, when modelling the transitions, a time invariance assumption with a center alignment point is preferred. During recognition trials, every frame is a potential boundary frame, and can be used as the center frame in hypothesizing a transition. The number of frames to use in the transition tracks is a design parameter which is to be chosen based on recognition performance over a development set.

2. Using the TDM (detailed above), the transition tracks are clustered together to arrive at a group of 200 transitions which are representative of the major classes into which such transitions fall. These major transition classes effectively serve as canonical transitions. However, rather than use a predetermined set of broad linguistic categories, bottom-up clustering is employed. This allows a large number of unsupervised data-driven transition models to be generated as follows.

Figure 9:
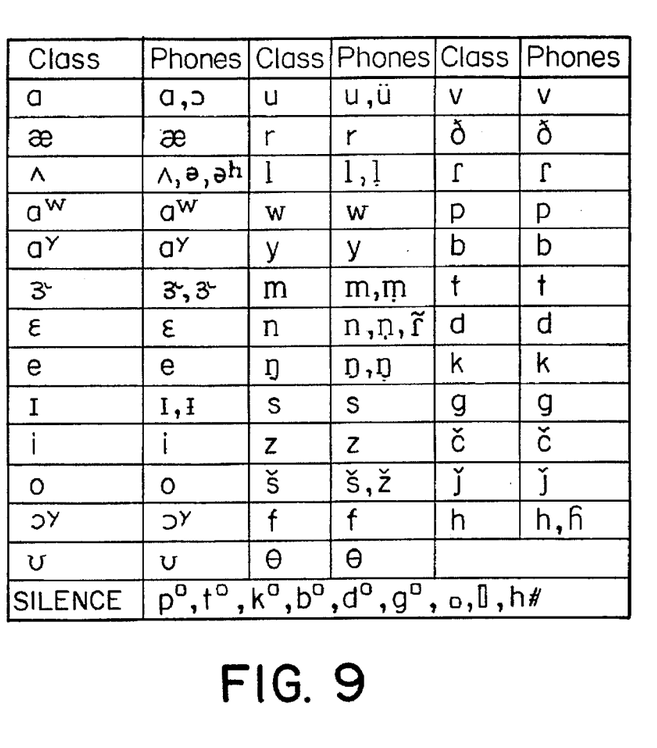
FIG. 9 is a table of the phone classes employed in the alternative feature of the present invention.

The goal in creating canonical transition models is to create robust models of as many distinctly different types of transitions as possible. The robustness of each model is determined by the amount of data available to estimate it's covariance parameters, and is therefore adversely affected as the total number of models is increased. Therefore, to generate a large number of transition models, the number of phonetic categories is chosen in the range of 40 to 60, and is preferably 42. The 42 categories in the preferred embodiment are based on the 39 categories listed in FIG. 9. In addition, the silence class is broken down into silence (h#, pause [□], epinthetic silence [|||]), voiced and unvoiced closures, and glottal stop [?].

Using 42 classes means there are a total of 1,764 possible phonetic transitions. The data set NIST Train was used to analyze the transitions, and 1,275 distinct transitions were found. Tracks of each of these transitions are computed, with each track consisting of 21 states. In this instance the tracks represent the mean MFCC values calculated over an interval of 105 ms., with the center frame aligned using the phonetic boundaries in the TIMIT transcriptions.

Figure 6:
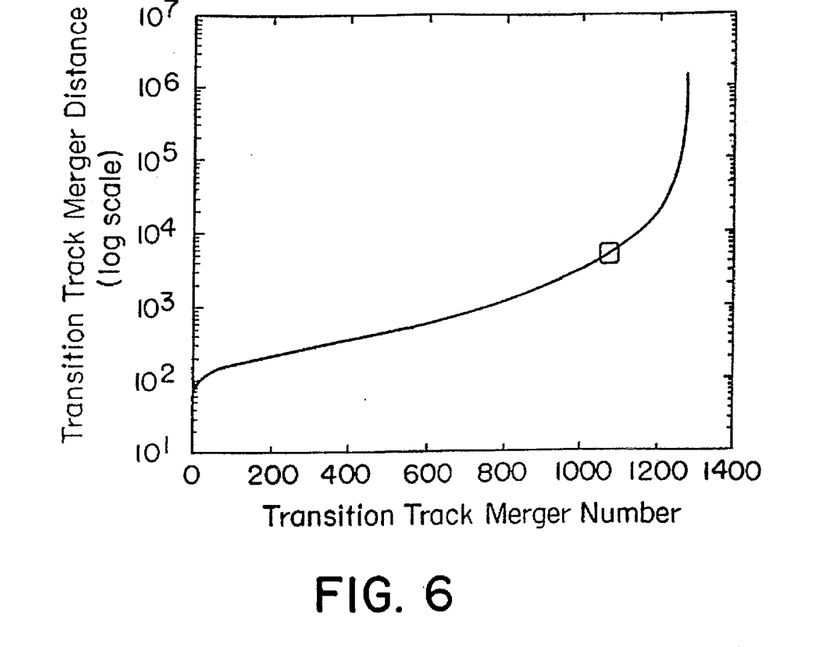
FIG. 6 is a graph of the distance between transition tracks in the clustering processes of an alternative feature of the present invention.

The tracks are then clustered, in an unsupervised manner, with the same bottom-up algorithm used in the creation of the context-dependent tracks discussed above. The distance between the closest tracks, calculated using the track distance metric (TDM), is shown for each merger in FIG. 6. However, in this instance it is not possible to use the phone dependent variances as the normalization weights in the TDM Equation above. Instead, the MFCC variances calculated over all of the phones are used as common normalization weights for each transition model.

To allow for a larger number of canonical transitions, the change in MFCC's are not used as statistical features. Since duration is not a variance for discriminating between transition models, the total number of dimensions in the Gaussian probability density function is 45, resulting in 1,013 independent parameters in each covariance matrix (recall the matrix is symmetric). This allows for creation of the 200 canonical transition models. The robustness of the covariance matrices may be checked by observing the range of eigenvalues and the size of the determinant.

3. Using the canonical transitions, a segmental map of each utterance is created. That is, in practice, the strategy is to preprocess an utterance, by scoring frames every change in T (track) with each of the canonical transition models. This effectively creates a segmentation map of the utterance. At each hypothesized transition frame, the segmentation map provides likelihood information pertaining to whether a transition took place, and also which of the canonical transitions are the most likely to have occurred there.

Thus, the transition models help in two ways. First, the transition models scores incorporated into the overall scoring framework help determine the phonetic identity of the two phones involved. Secondly, the transition models can be examined to determine likely segment boundaries within an utterance. This reduces the possible search space during phonetic recognition, particularly since the transition likelihoods provide an idea of which phones are involved in the transition as shown in detail next.

Referring back to FIG. 2, search component 24a employs acoustic model 30 of the present invention to perform search and phonetic recognition in an automatic speech recognition 40 as follows.

The problem of phonetic recognition may be stated as determining the most likely sequence of phonetic units, $A = \{\alpha_1 \alpha_2, \ldots, \alpha_N\}$, by searching a sequence of acoustic observations $X = \{\vec{\chi}_1, \vec{\chi}_2, \ldots, \vec{\chi}_T\}$. In a segment based system, each phonetic unit will also have an explicitly hypothesized starting and ending boundary associated with it. The sequence of boundaries which partitions the utterance into phonetic units is called a segmentation of the utterance, and is denoted by $S=\{s_1 s_2, \ldots, s_N\}$. Each $s_i$ is a frame number specifying the left phonetic boundary for the following phone. The observations associated with segment, $s_i$, will be denoted by $X(S_i)=\{\vec{\chi}_{s_i}, \vec{\chi}_{s_i+1}, \ldots, \vec{\chi}_{s_{i+1}-1}\}$.

Therefore, defining $S_i$ as a specific segmentation from the set $S$ of all possible segmentations of $X$, the problem can generally be stated as:

$$A^* = \underset{A}{\operatorname{argmax}}\ p(A|X) = \underset{A}{\operatorname{argmax}}\ \underset{S_i \in S}{\Sigma}\ p(AS_i|X)$$

And for implementation purposes can be stated as:

$$A^* = \underset{AS}{\operatorname{argmax}}\ p(A) \prod_{i=1}^{N} p_I(X(s_i)|a_i s_i)\ p_T(X(\delta_i)|a_i s_i) P(s_i|a_i)$$

for the context-independent score for an utterance; or $$A^* = \underset{AS}{\operatorname{argmax}}\ p(A) \prod_{i=1}^{N} p_I(X(s_i)|\gamma_i s_i)\ p_T(X(\delta_i)|\gamma_i s_i)\ p(s_i|\gamma_i)$$

for the context-dependent score of an utterance.

The term p(A) corresponds to the phonetic grammar of the utterance. This is the a-prior probability of the full hypothesized phonetic string. The term p(S|A) will nominally be approximated by p(S). This term is modelled simply as a segment transition weight, and it is strictly a function of the number of segments in S. Thus, it serves to control the trade-off between deletion and insertion errors. Where transition likelihood at frame $s_i$ is being computed, $\delta$ frames on each side of $s_i$ are included. The acoustic observations at this boundary that are used to calculate the transition likelihoods are denoted $X(\delta_i)=\{X_{si-\delta}, \ldots, X_{si+\delta}\}$. The term $p_i$ represents the likelihood of the internal component of $a_i$, and $p_T$ represents the likelihood of a transition from phone $a_i$ to phone $a_{i+1}$. The $p_T$ is used only when the transition models are included. The term $\gamma_j$ is the triphone $\{a_{j-1}, a_j, a_{j+1}\}$.

Figure 7:
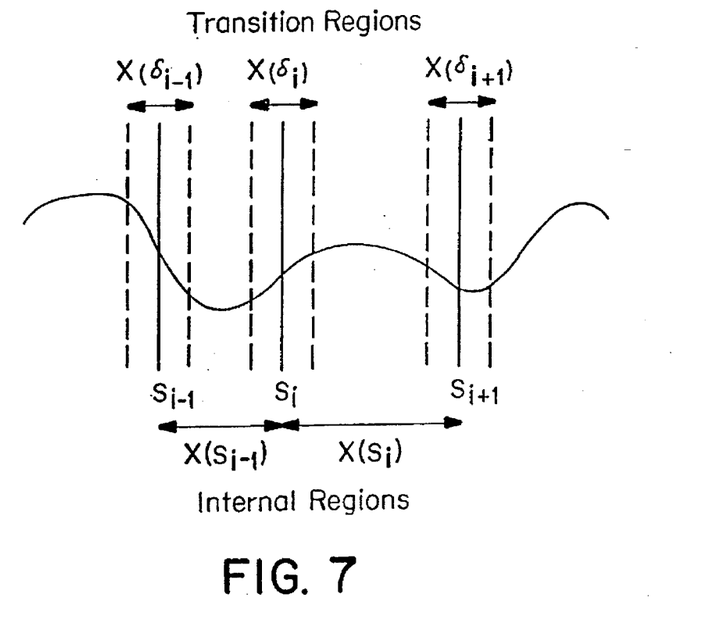
FIG. 7 is an illustration of a portion of an acoustic attribute partitioned into segments.

The relationship between the acoustic observations which comprise a segment, and the observations which are involved in the transition dynamics is depicted in FIG. 7. In that figure the wavy line illustrates a portion of an acoustic attribute, which is partitioned into segments s. Each segment consists of internal and transition regions as labelled. Note that the acoustic observations within each $X(\delta_i)$ are used twice, once for the acoustic score of the segment and again for the transition from the given segment to the following segment. However it is important to recall that the acoustic likelihoods are calculated not from the observations, but from the errors produced when the synthetic segment associated with the phone $a_i$ is compared to the observations. Since the transition models and the phone models produce different synthetic segments for comparison to the observation sequences $X(s_i)$ and $X(\delta_i)$ respectively, the errors produced by each of these calculations can be approximated as independent.

Figure 8:
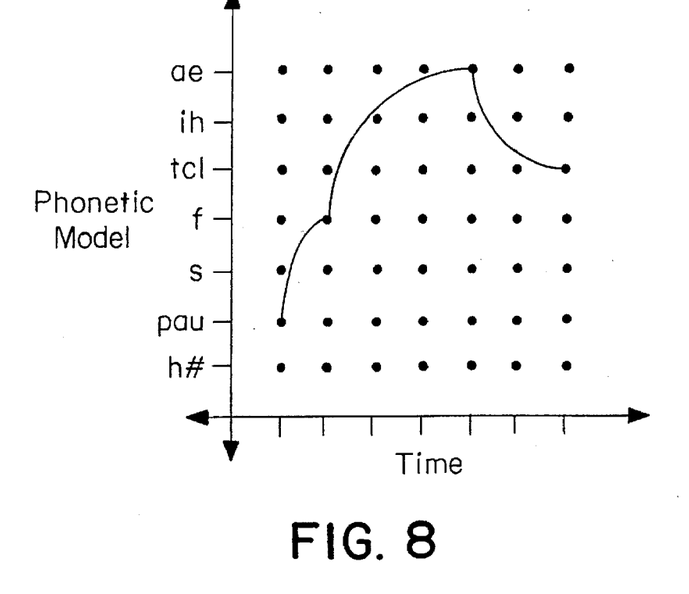
FIG. 8 is an illustration of a Viterbi search path employed by the search component of the embodiment of FIG. 2.

Search component 24a employs the foregoing in the Viterbi algorithm common in the art for search purposes. Briefly, the Viterbi algorithm is a time-synchronous beam search algorithm which utilizes dynamic programming. The search can be envisioned as finding the best path through a lattice. The x-axis represents time and the y-axis represents phonetic model. Each (x,y) coordinate represents a potential phonetic boundary at a specific time. Depending on the implementation strategy, the phonetic model coordinate can represent either the beginning or the end of a phonetic segment with the label specified by the coordinate. In the present invention, the search is conducted from left-to-right (increasing time) at an interval of $\Delta T$ frames. The value of $\Delta T$ determines how frequently a phonetic boundary is hypothesized. A segment is specified by an arc, connecting two points in the lattice. An example of a partial path through the lattice is shown in FIG. 8.

The cost associated with a segment is computed according to the above equations. At each point in time at which a segment boundary is hypothesized, the best path to reach each vertex at that time is retained. The best path is the path with the least cost associated with it. The search need only keep track of the best path to reach a vertex because of the dynamic programming aspect of the implementation. Therefore, at each vertex in the search, all that must be stored is the cost up to that time, along with a pointer to the vertex attached to the initial point of the arc.

By conducting an exhaustive search through the lattice, the complete path is constructed. The node with the least cost at the final frame is used to determine the phonetic label sequence along with the segmentation. Exhaustive search is computationally expensive. To compute the segment scores for M models with boundaries hypothesized at each of N frames requires a total of MN(N−1)/2 acoustic likelihood computations. However, this is assuming context-independence of each of the phonetic models. To perform a context-dependent search, the computational requirement becomes heavier. In this instance a single acoustic score connecting a vertex to a previous time is not sufficient. Instead, a context-dependent score must be computed based on the track of the phonetic unit which incorporates the contextual information. This adds an additional factor of M to the search computation for a biphone acoustic representation, and potentially a factor of $M^2$ for a triphone computation.

The specific implementation strategy becomes a key factor for context-dependent search. The designation of each vertex as a starting or ending boundary for the phonetic model at that coordinate becomes important. If the terminal vertex of each arc is designated as the endpoint for the phone specified by the vertex, then the left context in that path will be known, since it is the departure point for the arc. However, the potential right context associated with that arc is completely unknown. For example, using this type of implementation, the second arc in FIG. 8 represents an [ae], with an [f] as it's left context. But when the acoustic score for the [ae] is computed, no right context can yet be hypothesized for the merger to form a triphone synthetic segment.

The alternative is to designate the terminal vertex of an arc to be the starting boundary of the next phone in the sequence. Under this implementation, the second arc in FIG. 8 is an hypothesized [f] going to an [ae]. Now, both contexts can be used to create the synthetic segment, since the [f] is already assumed to be coming from a [☐] (pause). This will also allow for trigram constraints to be used in other system components. However, this is not a full triphone implementation, since every arc departing from the [f] is assumed to have the same left context. To hypothesize alternative left contexts in this instance significantly complicates the entire search process.

Due to the search that must take place during phonetic recognition, scoring for recognition trials is more complex than it is for phonetic classification trials. Since the number of segments being hypothesized may not be the same as the number of segments in the actual transcription, it is not sufficient to state that a particular segment is either correctly or incorrectly labelled. Instead, errors besides substitution errors can take place. These errors are deletions and insertions, and refer to phones in the utterance which are missed during the search process, and extra phones hypothesized during search which are not present in the provided transcription. The actual segment alignment times are not used in the scoring process.

To score an utterance, the reference transcription (that which is provided with the TIMIT database) is compared to a hypothesized transcription. A NIST (National Institute of Standards & Technology) designated alignment program is then used to align the two transcriptions such that the total number of errors (substitutions, deletions,and insertions) is minimized. The phonetic accuracy is then defined to be one minus the percentage of errors in the utterance:

% Errors=% Substitutions+% Deletions+% Insertions

% Accuracy=1.0–% Errors=% Correct–% Insertions

Note that it is mathematically possible to have an accuracy of less than zero, due to the presence of insertion errors.

EQUIVALENTS

Those skilled in the art will know, or be able to ascertain using no more than routine experimentation, many equivalents to the specific embodiments of the invention described herein.

For example, the above-described preferred embodiment forms a track for a given phone. Other units of speech instead of a phone may be employed. The subject unit of speech may be a sequence of phones or a specific transition from one phone to another, and the like.

In another example, procedure Traj2 of Table II is used to generate the tracks of the preferred embodiment. The other generation functions as described or variations of them are suitable for generating tracks of other embodiments of the present invention.

In a further example, a joint Gaussian probability density function is used to form the error models of the preferred embodiment. However other probability density functions, or other distance metrics, or other means,such as neural networks, may be employed to form the error models based on the error sequence E (FIG. 3) of the present invention. Such alternative modeling of the error are within the purview of one skilled in the art.

These and all other equivalents are intended to be encompassed by the following claims.

What is claimed is:

1. In a digital processor, speech recognition apparatus for decoding an input speech signal to a corresponding speech unit, the apparatus comprising:

a source providing an input speech signal formed of multiple observation frames;

a plurality of unit templates, each unit template for representing acoustic attributes of a respective speech unit and each unit template generating a respective synthetic segment indicative of the respective speech unit;

a plurality of error models associated with the unit templates, each unit template having an error model for explicitly measuring and quantitatively representing temporal and spatial correlations between the synthetic segments and a subject speech signal, the temporal and spatial correlations being between acoustic attributes in the observation frames of the subject speech signal; and processor means coupled to the unit templates and error models and coupled to the source to receive the input speech signal, the processor means comparing the synthetic segments to different plural observation frames of the input speech signal to define a set of error sequences and based on the error models, the processor means analyzing the error sequences and determining the corresponding speech unit of the input speech signal.

2. Apparatus as claimed in claim 1 wherein the unit templates employ a generation function to generate the synthetic segments.

3. Apparatus as claimed in claim 2 wherein the generation function is used to form each unit template.

4. Apparatus as claimed in claim 1 wherein each error model is formed from a probability density function; and the processor means determines the corresponding speech unit of the input speech signal to be the respective speech unit of the unit template corresponding to the most likely error model.

5. Apparatus as claimed in claim 1 wherein each error model is formed from a distance metric; and the processor means determines the corresponding speech unit of the input speech signal to be the respective speech unit of the unit template corresponding to the best error model.

6. Apparatus as claimed in claim 1 wherein each error sequence is normalized to a single error feature vector of fixed dimension before the processor means generates the error models.

7. Apparatus as claimed in claim 1 wherein the plurality of unit templates includes transition unit templates for representing acoustic transition dynamics between speech units within a speech signal.

8. Apparatus as claimed in claim 7 wherein the transition unit templates provide an indication of one of location of a transition in the input speech signal and speech units involved in the transition.

9. Apparatus as claimed in claim 1 further comprising a multiplicity of merged templates formed by a combination of a plurality of unit templates.

10. Apparatus as claimed in claim 1 wherein certain ones of the unit templates are templates for representing context-dependent acoustic attributes of a respective speech unit.

11. Apparatus as claimed in claim 1 wherein the respective speech unit for each unit template is a phonetic unit or a string of phonetic units.

12. In a digital processor, a method for decoding an input speech signal to a corresponding speech unit comprising the steps of:

providing an input speech signal formed of multiple observation frames;

providing a plurality of unit templates in stored memory of the digital processor, each unit template for representing acoustic attributes of a respective speech unit and for generating a respective target speech unit;

providing a plurality of error models associated with the unit templates in stored memory, each unit template having an error model for explicitly measuring and quantitatively representing temporal and spatial correlations between the synthetic segments and a subject speech signal, the temporal and spatial correlations being between acoustic attributes in the observation frames of the subject speech signal;

receiving the input speech signal in working memory of the digital processor;

comparing the target speech units with different plural observation frames of the input speech signal in working memory such that the comparison defines a set of error sequences in working memory; and using the error models, analyzing the error sequences and determining the corresponding speech unit of the input speech signal.

13. A method as claimed in claim 12 wherein the unit templates employ a generation function to generate the target speech units.

14. A method as claimed in claim 13 wherein the generation function is used to form each unit template.

15. A method as claimed in claim 12 wherein:

the step of generating the error models includes forming each error model from a probability density function; and the step of determining the corresponding speech unit includes determining a most likely error model such that the respective speech unit of the unit template corresponding to the most likely error model is the corresponding speech unit of the input speech signal.

16. A method as claimed in claim 12 wherein:

the step of generating the error models includes forming each error model from a distance metric; and the step of determining the corresponding speech unit includes determining a best error model, such that the respective speech unit of the unit template corresponding to the best error model is the corresponding speech unit of the input speech signal.

17. A method as claimed in claim 12 further comprising the step of normalizing each error sequence to a single error feature vector of fixed dimension before generating the error models.

18. A method as claimed in claim 17 wherein the step of normalizing includes averaging across each error sequence.

19. A method as claimed in claim 12 wherein the step of providing a plurality of unit templates includes providing transition unit templates for representing acoustic transition dynamics between speech units within a speech signal.

20. A method as claimed in claim 19 wherein the transition unit templates provide an indication of one of location of a transition in the input speech signal and speech units involved in the transition.

21. A method as claimed in claim 12 wherein the step of providing a plurality of unit templates includes combining a plurality of unit templates to form a multiplicity of merged templates that account for contextual effects on the respective speech units of the unit templates.

22. A method as claimed in claim 12 wherein the step of providing a plurality of unit templates includes providing a multiplicity of templates for representing context dependent acoustic attributes of a respective speech unit.

23. A method as claimed in claim 12 wherein the step of providing a plurality of unit templates includes providing phonetic unit templates for representing one of phonetic units of speech and strings of phonetic units of speech.

24. In a digital processor, speech recognition apparatus for decoding an input speech signal to a corresponding speech unit, the apparatus comprising:

a source providing an input speech signal formed of multiple observation frames;

a plurality of unit templates, each unit template for representing acoustic attributes of a respective speech unit and each unit template generating a respective synthetic segment indicative of the respective speech unit;

a plurality of error models associated with the unit templates, each unit template having an error model; and processor means coupled to the unit templates and error models and coupled to the source to receive the input speech signal, the processor means comparing the synthetic segments to different plural observation frames of the input speech signal to define a set of error sequences, the processor means transforming each error sequence to a fixed dimension error feature vector independent of the number of observation frames, and based on the error models, the processor means computing a score for the error feature vector.

25. The apparatus of claim 24 wherein each error model explicitly measures and quantitatively represents temporal and spatial correlations between the synthetic segments and a subject speech signal, the temporal and spatial correlations being between acoustic attributes in the observation frames of the subject speech signal.

26. The apparatus of claim 25 wherein the temporal and spatial correlations are between different acoustic attributes in different observation frames of the subject speech signal.

* * * * *